(12) United States Patent
Kim et al.

(10) Patent No.: US 9,829,077 B2
(45) Date of Patent: Nov. 28, 2017

(54) PLANETARY GEAR TRAIN OF AUTOMATIC TRANSMISSION FOR VEHICLE

(71) Applicant: HYUNDAI MOTOR COMPANY, Seocho-gu, Seoul (KR)

(72) Inventors: Jong Soo Kim, Seoul (KR); Jinseok Kim, Seoul (KR); Jae Chang Kook, Hwaseong-si (KR); Dong Hwan Hwang, Seoul (KR); Jin Ho Kim, Suwon-si (KR); Seong Wook Hwang, Gunpo-si (KR); Woo Jin Chang, Suwon-si (KR); Kyeong Hun Lee, Seoul (KR); Seongwook Ji, Ansan-si (KR); Chon Ok Kim, Yongin-si (KR); Wonmin Cho, Hwaseong-si (KR); Hyun Sik Kwon, Seoul (KR); Jong Sool Park, Hwaseong-si (KR); Tae Whan Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/158,208

(22) Filed: May 18, 2016

(65) Prior Publication Data
US 2017/0314647 A1   Nov. 2, 2017

(30) Foreign Application Priority Data
Apr. 29, 2016 (KR) .................. 10-2016-0053330

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
CPC ..... F16H 2200/0069; F16H 2200/2012; F16H 2200/2048; F16H 3/66
See application file for complete search history.

(56) References Cited

U.S. PATENT DOCUMENTS

| 8,734,286 | B2 | 5/2014 | Coffey et al. | |
|---|---|---|---|---|
| 8,870,705 | B2 | 10/2014 | Diemer et al. | |
| 2010/0069195 | A1* | 3/2010 | Baldwin | F16H 3/66 475/276 |
| 2011/0009229 | A1* | 1/2011 | Bauknecht | F16H 3/66 475/275 |
| 2013/0203548 | A1* | 8/2013 | Mellet | F16H 3/666 475/276 |
| 2014/0235398 | A1* | 8/2014 | Lippert | F16H 3/44 475/275 |
| 2015/0111690 | A1* | 4/2015 | Shim | F16H 3/66 475/280 |

* cited by examiner

*Primary Examiner* — Erin D Bishop
(74) *Attorney, Agent, or Firm* — Brinks Gilson & Lione

(57) ABSTRACT

A planetary gear train of an automatic transmission for a vehicle having an input shaft for receiving torque of an engine; an output shaft for outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements, improves power delivery performance and fuel economy by achieving at least ten forward speed stages.

11 Claims, 3 Drawing Sheets

FIG. 2

| Speed stages | Control element | | | | | | | Gear ratio | Step ratio | Note |
|---|---|---|---|---|---|---|---|---|---|---|
| | B1 | B2 | B3 | C1 | C2 | C3 | C4 | | | |
| D1 |  | ● | ● |  |  |  | ● | 6.81 | - | Gear ratio span : 10.53 |
| D2 | ● |  | ● |  |  |  | ● | 4.14 | 1.64 | |
| D3 |  |  | ● |  |  | ● | ● | 2.88 | 1.44 | |
| D4 | ● |  | ● |  |  | ● |  | 1.95 | 1.47 | |
| D5 | ● |  | ● | ● |  |  |  | 1.51 | 1.30 | |
| D6 | ● |  |  | ● |  | ● |  | 1.21 | 1.24 | |
| D7 |  |  |  | ● |  | ● | ● | 1.00 | 1.21 | |
| D8 |  | ● |  | ● |  |  | ● | 0.82 | 1.21 | |
| D9 |  | ● |  | ● |  |  |  | 0.73 | 1.13 | |
| D10 |  | ● |  | ● | ● |  |  | 0.65 | 1.13 | Ratio of REV/D1 : 0.89 |
| REV |  | ● | ● |  | ● |  |  | 6.08 | - | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0053330 filed on Apr. 29, 2016, the entirety of which is hereby incorporated by reference.

FIELD

The present disclosure relates to an automatic transmission for a vehicle. More particularly, the present disclosure relates to a planetary gear train of an automatic transmission for a vehicle.

BACKGROUND

The statements in this section merely provide background information related to the present disclosure and may not constitute prior art.

Generally, an automatic transmission achieving more speed stages has been developed to enhance fuel economy and improve drivability.

Such an automatic transmission achieving more speed stages allows for improved power performance and driving efficiency when downsizing an engine. Providing high efficiency multiple-speed transmissions with smooth step ratios that can be used as an index closely related to drivability such as acceleration before and after a shift increases competitiveness of an automatic transmission in the automotive field.

However, in the automatic transmission, as the number of speed stages increase, the number of internal components increase, and as a result, mountability, cost, weight, transmission efficiency, and the like may still deteriorate.

Accordingly, development of a planetary gear train that improves efficiency with a small number of components may be provided in order to increase a fuel efficiency enhancement effect through the multiple-speeds.

In this aspect, in recent years, 8-speed automatic transmissions tend to be implemented and the research and development of a planetary gear train capable of implementing more speed stages has also been actively conducted.

However, since a conventional 8-speed automatic transmission has gear ratio span of 6.5-7.5 (gear ratio span is an important factor for securing linearity of step ratios), improvement of power performance and fuel economy may be minimal.

In addition, if an 8-speed automatic transmission has a gear ratio span larger than 9.0, we have found that it is difficult to secure linearity of step ratios. Therefore, driving efficiency of an engine and drivability of a vehicle may be deteriorated, and thus, development of high efficiency automatic transmissions which achieve at least nine forward speed stages is desired.

The above information disclosed in this Background section is only for enhancement of understanding of the background of the invention and therefore it may contain information that does not form the prior art that is already known in this country to a person of ordinary skill in the art.

SUMMARY

The present disclosure provides a planetary gear train of an automatic transmission for a vehicle capable of improving power delivery performance and fuel economy by achieving at least ten forward speed stages and one reverse speed stage, widening a gear ratio span, and securing linearity of step ratios.

A planetary gear train of an automatic transmission for a vehicle according to an embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connecting the first rotational element, the sixth rotational element, the eighth rotational element and the tenth rotational element; a second shaft connected to the second rotational element and directly connected to the input shaft; a third shaft connecting the third rotational element with the seventh rotational element; a fourth shaft connected to the fourth rotational element and selectively connected to the second shaft; a fifth shaft connected to the fifth rotational element and selectively connected to the second shaft; a sixth shaft connected to the ninth rotational element; and a seventh shaft connected to the eleventh rotational element and directly connected to the output shaft.

The third shaft is selectively connected to the seventh shaft, the fourth shaft is selectively connected to a transmission housing in a state of not being connected to the second shaft, and the fifth shaft is selectively connected to the sixth shaft, and is selectively connected to the transmission housing in a state of not being connected to the second shaft.

The planetary gear train may further include an eighth shaft connected to the twelfth rotational element and selectively connected to the transmission housing.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and a tenth, eleventh, and twelfth rotation elements of the fourth planetary gear set may be a fourth sun gear, a fourth planet carrier, and a fourth ring gear, respectively.

In one aspect, the first, second, third, and fourth planetary gear sets may be disposed in a sequence of the second planetary gear set, the third planetary gear set, the first planetary gear set, and the fourth planetary gear set from the engine.

In another aspect, the first, second, third, and fourth planetary gear sets may be disposed in a sequence of the second planetary gear set, the third planetary gear set, the fourth planetary gear set, and the first planetary gear set from the engine.

The planetary gear train may further include: a first clutch selectively connecting the third shaft with the seventh shaft; a second clutch selectively connecting the second shaft with the fourth shaft; a third clutch selectively connecting the second shaft with the fifth shaft; a fourth clutch selectively connecting the fifth shaft with the sixth shaft; a first brake selectively connecting the fourth shaft with the transmission housing; a second brake selectively connecting the fifth shaft with the transmission housing; and a third brake selectively connecting the eighth shaft with the transmission housing.

A planetary gear train of an automatic transmission for a vehicle according to another exemplary embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements, wherein the input shaft is directly connected to the second rotational element, the output shaft is directly connected to the eleventh rotational element, the first rotational element is directly connected to the sixth rotational element, the eighth rotational element and the tenth rotational element, the third rotational element is directly connected to the seventh rotational element, the fourth rotational element is selectively connected to a transmission housing, the fifth rotational element is selectively connected to the ninth rotational element and is selectively connected to the transmission housing, and the eighth rotational element is selectively connected to the transmission housing.

The third rotational element is selectively connected to the eleventh rotational element, the fourth rotational element is selectively connected to the second rotational element in a state of not being connected to the transmission housing, and the fifth rotational element is selectively connected to the second rotational element in a state of not being connected to the transmission housing.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

In one aspect, the first, second, third, and fourth planetary gear sets may be disposed in a sequence of the second planetary gear set, the third planetary gear set, the first planetary gear set, and the fourth planetary gear set from the engine.

In another aspect, the first, second, third, and fourth planetary gear sets may be disposed in a sequence of the second planetary gear set, the third planetary gear set, the fourth planetary gear set, and the first planetary gear set from the engine.

The planetary gear train may further include: a first clutch selectively connecting the third rotational element with the eleventh rotational element; a second clutch selectively connecting the second rotational element with the fourth rotational element; a third clutch selectively connecting the second rotational element with the fifth rotational element; a fourth clutch selectively connecting the fifth rotational element with the ninth rotational element; a first brake selectively connecting the fourth rotational element with the transmission housing; a second brake selectively connecting the fifth rotational element with the transmission housing; and a third brake selectively connecting the twelfth rotational element with the transmission housing.

An exemplary embodiment of the present disclosure may achieve at least ten forward speed stages and one reverse speed stage by combining four planetary gear sets being simple planetary gear sets with seven control elements.

In addition, since gear ratio span greater than 10.0 is secured, driving efficiency of the engine may be maximized. In addition, since linearity of step ratios can be secured due to multiple speed stages, drivability such as acceleration before and after shift, rhythmical engine speed, and so on may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which:

FIG. 2 is an operation chart of control elements at each speed stage in the planetary gear train according to the first embodiment of the present disclosure.

Figure 1:
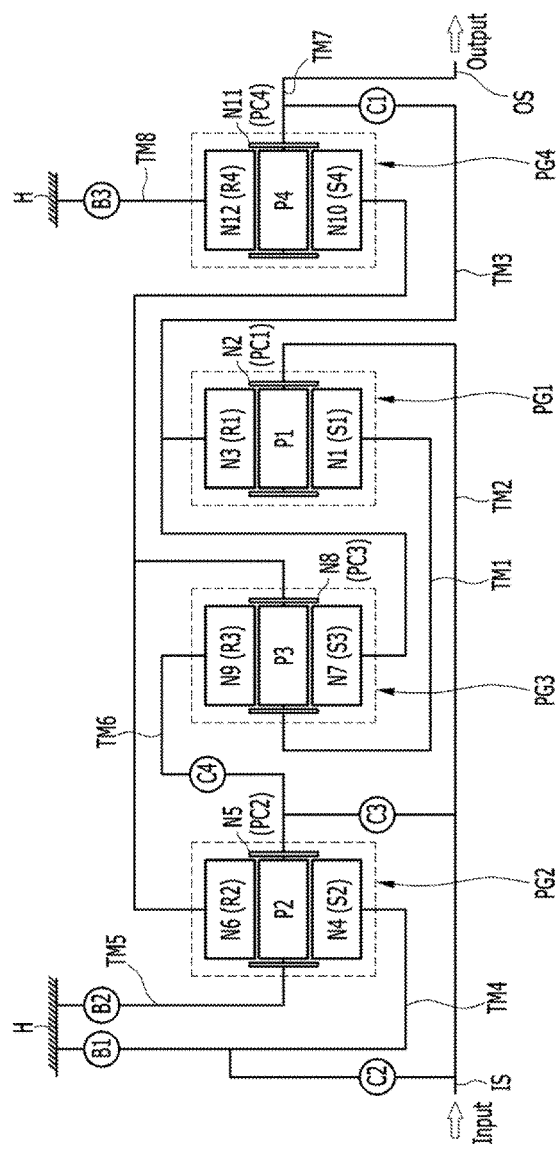
FIG. 1 is a schematic diagram of a planetary gear train according to the first embodiment of the present disclosure.

The drawings described herein are for illustration purposes only and are not intended to limit the scope of the present disclosure in any way.

DESCRIPTION OF SYMBOLS

B1, B2, B3: first, second, and third brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shafts

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same as each other and an order thereof is not particularly limited.

FIG. 1 is a schematic diagram of a planetary gear train according to the first embodiment of the present disclosure.

As shown in FIG. 1, a planetary gear train according to first embodiment of the present disclosure includes first, second, third, and fourth planetary gear sets PG1, PG2, PG3, and PG4 disposed on the same axis, an input shaft IS, an output shaft OS, eight shafts TM1, TM2, TM3, TM4, TM5, TM6, TM7, and TM8 connected to at least one of rotation elements of the first, second, third, and fourth planetary gear sets PG1, PG2, PG3, and PG4, four clutches C1, C2, C3, and C4 and three brakes B1, B2, and B3 that are control elements, and a transmission housing H.

Torque input from the input shaft IS is changed by cooperation of the first, second, third, and fourth planetary gear sets PG1, PG2, PG3, and PG4, and the changed torque is output through the output shaft OS.

The planetary gear set in the first embodiment of the present disclosure are disposed in a sequence of the second, third, first, and fourth planetary gear sets PG2, PG3, PG1, and PG4 from the engine.

The input shaft IS is an input member and torque from a crankshaft of the engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotational element N1 is directly connected to the sixth rotational element N6, the eighth rotational element N8, and the tenth rotational element N10, and the third rotational element N3 is directly connected to the seventh rotational element N7 such that the first, second, third, and fourth planetary gear sets PG1, PG2, PG3, and PG4 include eight shafts TM1, TM2, TM3, TM4, TM5, TM6, TM7, and TM8.

The eight shafts TM1, TM2, TM3, TM4, TM5, TM6, TM7, and TM8 will be described in further detail.

The eight shafts TM1, TM2, TM3, TM4, TM5, TM6, TM7, and TM8 directly connect a plurality of rotation elements among the rotation elements of the planetary gear sets PG1, PG2, PG3, and PG4. The eight shafts TM1, TM2, TM3, TM4, TM5, TM6, TM7, and TM8 are rotation members that are directly connected to any one rotation element of the planetary gear sets PG1, PG2, PG3, and PG4 and rotate with the any one rotation element to transmit torque, or are fixed members that directly connect any one rotation element of the planetary gear sets PG1, PG2, PG3, and PG4 to the transmission housing H to fix the any one rotation element.

The first shaft TM1 directly connects the first rotational element N1 (first sun gear S1) with the sixth rotational element N6 (second ring gear R2), the eighth rotational element N8 (third planet carrier PC3), and the tenth rotational element N10 (fourth sun gear S4).

The second shaft TM2 is directly connected to the second rotational element N2 (first planet carrier PC1) and is directly connected to the input shaft IS so as to be operated as an input element continuously.

The third shaft TM3 directly connects the third rotational element N3 (first ring gear R1) with the seventh rotational element N7 (third sun gear S3).

The fourth shaft TM4 is connected to the fourth rotational element N4 (second sun gear S2, and is selectively connected to the second shaft TM2 so as to be operated as a selective input element or is connected to the transmission housing H so as to be operated as a selective fixed element.

Herein, the fourth shaft TM4 is selectively connected to the transmission housing H in a state of not being connected to the second shaft TM2.

The fifth shaft TM5 is connected to the fifth rotational element N5 (second planet carrier PC2), and is selectively connected to the second shaft TM2 so as to be operated as a selective input element or is selectively connected to the transmission housing H so as to be operated as a selective fixed element.

Herein, the fifth shaft TM5 is selectively connected to the transmission housing H in a state of not being connected to the second shaft TM2.

The sixth shaft TM6 is connected to ninth rotational element N9 (third ring gear R3) and is selectively connected to the fifth shaft TM5.

The seventh shaft TM7 is connected to the eleventh rotational element N11 (fourth planet carrier PC4), is selectively connected to the third shaft TM3, and is directly connected to the output shaft OS so as to be continuously connected to an output element.

The eighth shaft TM8 is connected to the twelfth rotational element N12 (fourth ring gear R4) and is selectively connected to the transmission housing H so as to be operated as a selective fixed element.

In addition, four clutches C1, C2, C3, and C4 are disposed at portions at which any two shafts among the eight shafts TM1, TM2, TM3, TM4, TM5, TM6, TM7, and TM8 including the input shaft IS and the output shaft OS are selectively connected to each other.

In addition, three brakes B1, B2, and B3 are disposed at portions at which any one shaft among the eight shafts TM1, TM2, TM3, TM4, TM5, TM6, TM7, and TM8 is selectively connected to the transmission housing H.

Arrangements of the four clutches C1, C2, C3, and C4 and the three brakes B1, B2, and B3 are described in detail.

The first clutch C1 is disposed between the third shaft TM3 and the seventh shaft TM7 or the output shaft OS and selectively connects the third shaft TM3 with the seventh shaft TM7 or the output shaft OS.

The second clutch C2 is disposed between the second shaft TM2 and the fourth shaft TM4 and selectively connects the second shaft TM2 with the fourth shaft TM4.

The third clutch C3 is disposed between the second shaft TM2 and the fifth shaft TM5 and selectively connects the second shaft TM2 with the fifth shaft TM5.

The fourth clutch C4 is disposed between the fifth shaft TM5 and the sixth shaft TM6 and selectively connects the fifth shaft TM5 with the sixth shaft TM6.

The first brake B1 is disposed between the fourth shaft TM4 and the transmission housing H and selectively connects the fourth shaft TM4 with the transmission housing H.

The second brake B2 is disposed between the fifth shaft TM5 and the transmission housing H and selectively connects the fifth shaft TM5 with the transmission housing H.

The third brake B3 is disposed between the eighth shaft TM8 and the transmission housing H and selectively connects the eighth shaft TM8 with the transmission housing H.

As shown in FIG. 1 that the second clutch C2 and the third clutch C3 selectively connect the second shaft TM2 with the fourth shaft TM4 and the second shaft TM2 with the fifth shaft TM5, respectively. Since the second shaft TM2 is directly connected to the input shaft IS, the second clutch C2 can selectively connect the input shaft IS with the fourth shaft TM4 and the third clutch C3 can selectively connect the input shaft IS with the fifth shaft TM5.

The second clutch C2 and the first brake B1 selectively connect the fourth shaft TM4 with the second shaft TM2 directly connected to the input shaft IS and the transmission housing H, respectively. Therefore, both of the second clutch C2 and the first brake B1 are not simultaneously operated at each speed stage.

In addition, the third clutch C3 and the second brake B2 selectively connect the fifth shaft TM5 with the second shaft TM2 directly connected to the input shaft IS and the transmission housing H, respectively. Therefore, both of the third clutch C3 and the second brake B2 are not simultaneously operated at each speed stage.

The control elements including the first, second, third, and fourth clutches C1, C2, C3, and C4 and the first, second, and third brakes B1, B2, and B3 may be multi-plates friction elements of wet type that are operated by hydraulic pressure.

FIG. 2 is an operation chart of control elements at each speed stage in the planetary gear train according to the first embodiment of the present disclosure.

As shown in FIG. 2, three control elements among the first, second, third, and fourth clutches C1, C2, C3, and C4 and the first, second, and third brakes B1, B2, and B3 are operated at each speed stage in the planetary gear train according to the first embodiment of the present disclosure. The first embodiment of the present disclosure can achieve one reverse speed stage and ten forward speed stages and shifting processes will be described in detail.

The second and third brakes B2 and B3 and the fourth clutch C4 are simultaneously operated at a first forward speed stage D1.

In a state that the fifth shaft TM5 is connected to the sixth shaft TM6 by operation of the fourth clutch C4, the torque of the input shaft IS is input to the second shaft TM2. In addition, the fifth shaft TM5 and the eighth shaft TM8 are operated as the fixed elements by operation of the second and third brakes B2 and B3. Therefore, the torque of the input shaft IS is shifted into the first forward speed stage, and the first forward speed stage is output through the output shaft OS connected to the seventh shaft TM7.

The first and third brakes B1 and B3 and the fourth clutch C4 are simultaneously operated at a second forward speed stage D2.

In a state that the fifth shaft TM5 is connected to the sixth shaft TM6 by operation of the fourth clutch C4, the torque of the input shaft IS is input to the second shaft TM2. In addition, the fourth shaft TM4 and the eighth shaft TM8 are operated as the fixed elements by operation of the first and third brakes B1 and B3. Therefore, the torque of the input shaft IS is shifted into the second forward speed stage, and the second forward speed stage is output through the output shaft OS connected to the seventh shaft TM7.

The third brake B3 and the third and fourth clutches C3 and C4 are simultaneously operated at a third forward speed stage D3.

In a state that the second shaft TM2 is connected to the fifth shaft TM5 by operation of the third clutch C3 and the fifth shaft TM5 is connected to the sixth shaft TM6 by operation of the fourth clutch C4, the torque of the input shaft IS is input to the second shaft TM2 and the fifth shaft TM5. In addition, the eighth shaft TM8 is operated as the fixed element by operation of the third brake B3. Therefore, the torque of the input shaft IS is shifted into the third forward speed stage, and the third forward speed stage is output through the output shaft OS connected to the seventh shaft TM7.

The first and third brakes B1 and B3 and the third clutch C3 are simultaneously operated at a fourth forward speed stage D4.

In a state that the second shaft TM2 is connected to the fifth shaft TM5 by operation of the third clutch C3, the torque of the input shaft IS is input to the second shaft TM2 and the fifth shaft TM5. In addition, the fourth shaft TM4 and the eighth shaft TM8 are operated as the fixed elements by operation of the first and third brakes B1 and B3. Therefore, the torque of the input shaft IS is shifted into the fourth forward speed stage, and the fourth forward speed stage is output through the output shaft OS connected to the seventh shaft TM7.

The first and third brakes B1 and B3 and the first clutch C1 are simultaneously operated at a fifth forward speed stage D5.

In a state that the third shaft TM3 is connected to the seventh shaft TM7 by operation of the first clutch C1, the torque of the input shaft IS is input to the second shaft TM2. In addition, the fourth shaft TM4 and the eighth shaft TM8 are operated as the fixed elements by operation of the first and third brakes B1 and B3. Therefore, the torque of the input shaft IS is shifted into the fifth forward speed stage, and the fifth forward speed stage is output through the output shaft OS connected to the seventh shaft TM7.

The first brake B1 and the first and third clutches C1 and C3 are simultaneously operated at a sixth forward speed stage D6.

In a state that the third shaft TM3 is connected to the seventh shaft TM7 by operation of the first clutch C1 and the second shaft TM2 is connected to the fifth shaft TM5 by operation of the third clutch C3, the torque of the input shaft IS is input to the second shaft TM2 and the fifth shaft TM5. In addition, the fourth shaft TM4 is operated as the fixed element by operation of the first brake B1. Therefore, the torque of the input shaft IS is shifted into the sixth forward speed stage, and the sixth forward speed stage is output through the output shaft OS connected to the seventh shaft TM7.

The first, third, and fourth clutches C1, C3, and C4 are simultaneously operated at a seventh forward speed stage D7.

In a state that the third shaft TM3 is connected to the seventh shaft TM7 by operation of the first clutch C1, the second shaft TM2 is connected to the fifth shaft TM5 by operation of the third clutch C3, and the fifth shaft TM5 is connected to the sixth shaft TM6 by operation of the fourth clutch C4, the torque of the input shaft IS is input to the second shaft TM2 and the fifth shaft TM5. Therefore, all the planetary gear sets become lock-up states, thereby the torque of the input shaft IS being shifted into the seventh forward speed stage, and the seventh forward speed stage being output through the output shaft OS connected to the seventh shaft TM7.

The second brake B2 and the first and fourth clutches C1 and C4 are simultaneously operated at an eighth forward speed stage D8.

In a state that the third shaft TM3 is connected to the seventh shaft TM7 by operation of the first clutch C1 and the fifth shaft TM5 is connected to the sixth shaft TM6 by operation of the fourth clutch C4, the torque of the input shaft IS is input to the second shaft TM2. In addition, the fifth shaft TM5 is operated as the fixed element by operation of the second brake B2. Therefore, the torque of the input shaft IS is shifted into the eighth forward speed stage, and the eighth forward speed stage is output through the output shaft OS connected to the seventh shaft TM7.

The first and second brakes B1 and B2 and the first clutch C1 are simultaneously operated at a ninth forward speed stage D9.

In a state that the third shaft TM3 is connected to the seventh shaft TM7 by operation of the first clutch C1, the torque of the input shaft IS is input to the second shaft TM2. In addition, the fourth shaft TM4 and the fifth shaft TM5 are operated as the fixed elements by operation of the first and second brakes B1 and B2. Therefore, the torque of the input shaft IS is shifted into the ninth forward speed stage, and first, second brake B1 and B2 is output through the output shaft OS connected to the seventh shaft TM7.

The second brake B2 and the first and second clutches C1 and C2 are simultaneously operated at a tenth forward speed stage D10.

In a state that the third shaft TM3 is connected to the seventh shaft TM7 by operation of the first clutch C1 and the second shaft TM2 is connected to the fourth shaft TM4 by operation of the second clutch C2, the torque of the input shaft IS is input to the second shaft TM2 and the fourth shaft TM4. In addition, the fifth shaft TM5 is operated as the fixed element by operation of the second brake B2. Therefore, the torque of the input shaft IS is shifted into the tenth forward speed stage, and the tenth forward speed stage is output through the output shaft OS connected to the seventh shaft TM7.

The second and third brakes B2 and B3 and the second clutch C2 are simultaneously operated at a reverse speed stage REV.

In a state that the second shaft TM2 is connected to the fourth shaft TM4 by operation of the second clutch C2, the torque of the input shaft IS is input to the second shaft TM2 and the fourth shaft TM4. In addition, the fifth shaft TM5 and the eighth shaft TM8 are operated as the fixed elements by operation of the second and third brakes B2 and B3. Therefore, the torque of the input shaft IS is shifted into the reverse speed stage, and the reverse speed stage is output through the output shaft OS connected to the seventh shaft TM7 as an inverse rotation speed.

The planetary gear trains according to the first embodiment of the present disclosure may achieve at least ten forward speed stages and one reverse speed stage by combining four planetary gear sets PG1, PG2, PG3, and PG4 with the four clutches C1, C2, C3, and C4 and the three brakes B1, B2, and B3.

In addition, since a gear ratio span greater than 10.53 is secured, driving efficiency of the engine may be increased.

In addition, since linearity of step ratios can be secured due to multiple speed stages, drivability such as acceleration before and after shift, rhythmical engine speed, and so on may be improved.

Figure 3:
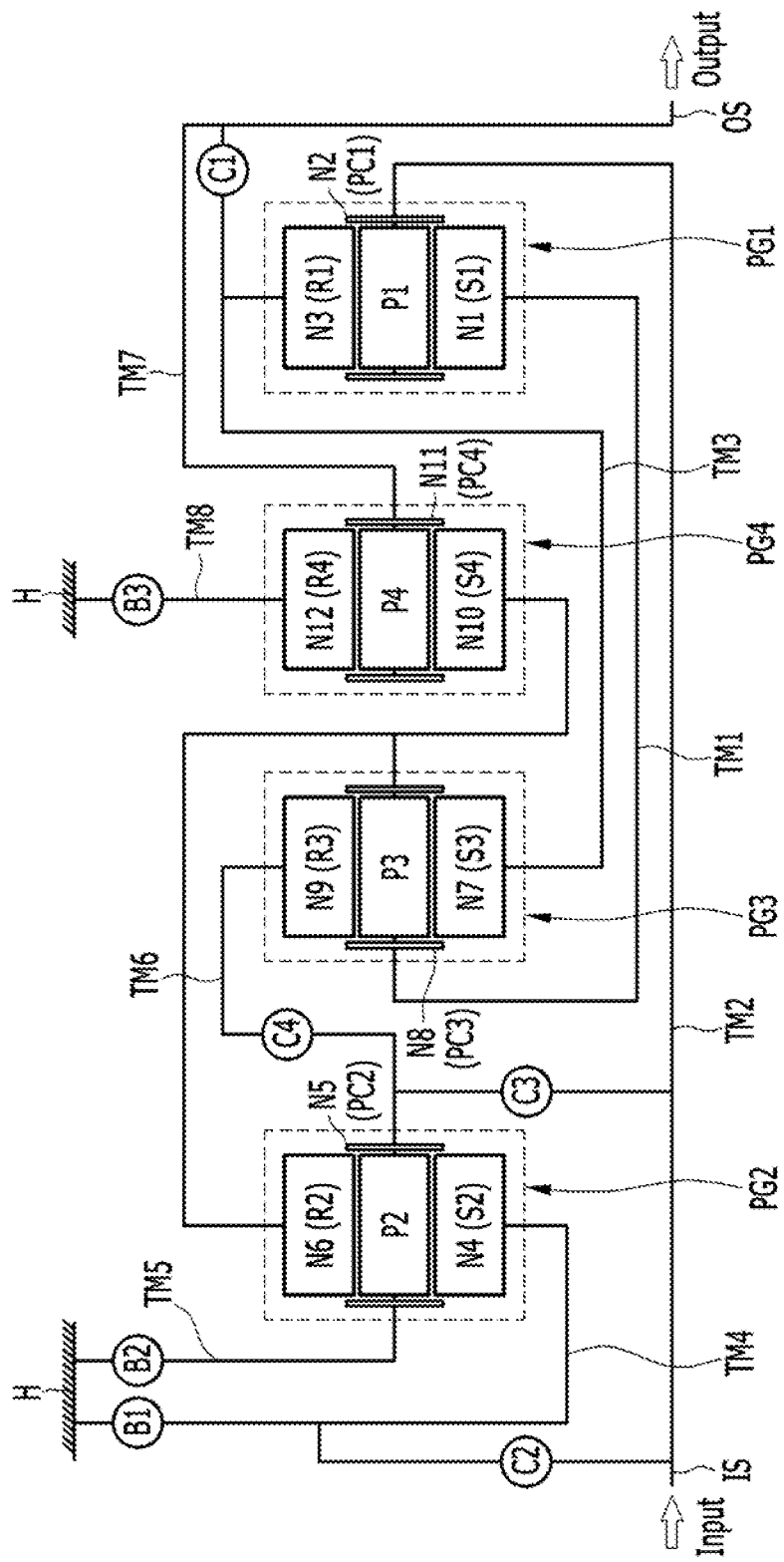
FIG. 3 is a schematic diagram of a planetary gear train according to the second embodiment of the present disclosure.

FIG. 3 is a schematic diagram of a planetary gear train according to the second embodiment of the present disclosure.

Referring to FIG. 1, the first, second, third, and fourth planetary gear sets are disposed in a sequence of the second, third, first, and fourth planetary gear sets PG2, PG3, PG1, and PG4 from the engine according to the first embodiment, but, as shown in FIG. 3, the first, second, third, and fourth planetary gear sets are disposed in a sequence of the second, third, fourth, and first planetary gear trains PG2, PG3, PG4, and PG1 from the engine according to the second embodiment.

The connections of the shafts and the transmission housing according to the second embodiment are the same as those according to the first embodiment but arrangements of the planetary gear sets according to the second embodiment are different from those according to the first embodiment. The shifting processes of the second embodiment are the same as those of the first embodiment.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A planetary gear train of an automatic transmission for a vehicle comprising:
    an input shaft for receiving torque of an engine;
    an output shaft for outputting torque;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements;
    a first shaft fixedly connecting the first rotational element, the sixth rotational element, the eighth rotational element and the tenth rotational element;
    a second shaft fixedly connected to the second rotational element and the input shaft;
    a third shaft fixedly connecting the third rotational element with the seventh rotational element;
    a fourth shaft fixedly connected to the fourth rotational element and selectively connected to the second shaft;
    a fifth shaft fixedly connected to the fifth rotational element and selectively connected to the second shaft;
    a sixth shaft fixedly connected to the ninth rotational element; and
    a seventh shaft fixedly connected to the eleventh rotational element and the output shaft.

2. The planetary gear train of claim 1, wherein the third shaft is selectively connected to the seventh shaft,
    the fourth shaft is selectively connected to a transmission housing when the fourth shaft is not connected to the second shaft, and
    the fifth shaft is selectively connected to the sixth shaft, and is selectively connected to the transmission housing when the fifth shaft is not connected to the second shaft, and
    wherein the planetary gear train further comprises an eighth shaft fixedly connected to the twelfth rotational element and selectively connected to the transmission housing.

3. The planetary gear train of claim 2, further comprising:
a first clutch selectively connecting the third shaft with the seventh shaft;
a second clutch selectively connecting the second shaft with the fourth shaft;
a third clutch selectively connecting the second shaft with the fifth shaft;
a fourth clutch selectively connecting the fifth shaft with the sixth shaft;
a first brake selectively connecting the fourth shaft with the transmission housing;
a second brake selectively connecting the fifth shaft with the transmission housing; and
a third brake selectively connecting the eighth shaft with the transmission housing.

4. The planetary gear train of claim 1, wherein the first, second, and third rotation elements of the first planetary gear set are a first sun gear, a first planet carrier, and a first ring gear, respectively;
the fourth, fifth, and sixth rotation elements of the second planetary gear set are a second sun gear, a second planet carrier, and a second ring gear, respectively;
the seventh, eighth, and ninth rotation elements of the third planetary gear set are a third sun gear, a third planet carrier, and a third ring gear, respectively; and
the tenth, eleventh, and twelfth rotation elements of the fourth planetary gear set are a fourth sun gear, a fourth planet carrier, and a fourth ring gear, respectively.

5. The planetary gear train of claim 1, wherein the first, second, third, and fourth planetary gear sets are disposed in a sequence of the second planetary gear set, the third planetary gear set, the first planetary gear set, and the fourth planetary gear set from the engine.

6. The planetary gear train of claim 1, wherein the first, second, third, and fourth planetary gear sets are disposed in a sequence of the second planetary gear set, the third planetary gear set, the fourth planetary gear set, and the first planetary gear set from the engine.

7. A planetary gear train of an automatic transmission for a vehicle comprising:
an input shaft for receiving torque of an engine;
an output shaft for outputting torque;
a first planetary gear set including first, second, and third rotation elements;
a second planetary gear set including fourth, fifth, and sixth rotation elements;
a third planetary gear set including seventh, eighth, and ninth rotation elements; and
a fourth planetary gear set including tenth, eleventh, and twelfth rotation elements,
wherein the input shaft is fixedly connected to the second rotational element,
the output shaft is fixedly connected to the eleventh rotational element,
the first rotational element is fixedly connected to the sixth rotational element, the eighth rotational element and the tenth rotational element,
the third rotational element is fixedly connected to the seventh rotational element and selectively connected to the eleventh rotational element,
the fourth rotational element is selectively connected to a transmission housing,
the fifth rotational element is selectively connected to the ninth rotational element and is selectively connected to the transmission housing,
the twelfth rotational element is selectively connected to the transmission housing,
the fourth rotational element is selectively connected to the second rotational element when the fourth rotational element is not connected to the transmission housing, and
the fifth rotational element is selectively connected to the second rotational element when the fifth rotational element is not connected to the transmission housing.

8. The planetary gear train of claim 7, wherein the first, second, and third rotation elements of the first planetary gear set are a first sun gear, a first planet carrier, and a first ring gear, respectively;
the fourth, fifth, and sixth rotation elements of the second planetary gear set are a second sun gear, a second planet carrier, and a second ring gear, respectively;
the seventh, eighth, and ninth rotation elements of the third planetary gear set are a third sun gear, a third planet carrier, and a third ring gear, respectively; and
the tenth, eleventh, and twelfth rotation elements of the fourth planetary gear set are a fourth sun gear, a fourth planet carrier, and a fourth ring gear, respectively.

9. The planetary gear train of claim 7, wherein the first, second, third, and fourth planetary gear sets are disposed in a sequence of the second planetary gear set, the third planetary gear set, the first planetary gear set, and the fourth planetary gear set from the engine.

10. The planetary gear train of claim 7, wherein the first, second, third, and fourth planetary gear sets are disposed in a sequence of the second planetary gear set, the third planetary gear set, the fourth planetary gear set, and the first planetary gear set from the engine.

11. The planetary gear train of claim 7, further comprising:
a first clutch selectively connecting the third rotational element with the eleventh rotational element;
a second clutch selectively connecting the second rotational element with the fourth rotational element;
a third clutch selectively connecting the second rotational element with the fifth rotational element;
a fourth clutch selectively connecting the fifth rotational element with the ninth rotational element;
a first brake selectively connecting the fourth rotational element with the transmission housing;
a second brake selectively connecting the fifth rotational element with the transmission housing; and
a third brake selectively connecting the twelfth rotational element with the transmission housing.

* * * * *